(12) United States Patent
Huffman et al.

(10) Patent No.: US 12,524,076 B2
(45) Date of Patent: Jan. 13, 2026

(54) PERSONAL WELLNESS KEYBOARD USING LIGHTING AND MACHINE LEARNING

(71) Applicant: Google LLC, Mountain View, CA (US)

(72) Inventors: Katherine Blair Huffman, Menlo Park, CA (US); Forrest Robert Smith, Buffalo, NY (US)

(73) Assignee: Google LLC, Mountain View, CA (US)

(*) Notice: Subject to any disclaimer, the term of this patent is extended or adjusted under 35 U.S.C. 154(b) by 287 days.

(21) Appl. No.: 17/879,195

(22) Filed: Aug. 2, 2022

(65) Prior Publication Data
US 2024/0047155 A1 Feb. 8, 2024

(51) Int. Cl.
*G06F 3/01* (2006.01)

(52) U.S. Cl.
CPC ........ *G06F 3/016* (2013.01); *G06F 2203/011* (2013.01)

(58) Field of Classification Search
CPC .. G06F 3/016; G06F 2203/011; G06F 3/0202; H01H 13/84; H01H 2215/052; H01H 2219/039; H01H 13/83; H01H 2239/006
See application file for complete search history.

(56) References Cited

U.S. PATENT DOCUMENTS

| | | | | |
|---|---|---|---|---|
| 10,292,585 | B1* | 5/2019 | Talwai | A61B 5/4836 |
| 2006/0250361 | A1* | 11/2006 | Chang | G06F 3/03543 |
| | | | | 345/163 |
| 2009/0002178 | A1* | 1/2009 | Guday | A61B 5/0002 |
| | | | | 340/573.1 |
| 2012/0039650 | A1* | 2/2012 | Cvek | G06F 3/0219 |
| | | | | 400/472 |
| 2016/0246373 | A1 | 8/2016 | Sakaguchi et al. | |
| 2017/0046496 | A1* | 2/2017 | Johnstone | G06Q 50/01 |
| 2021/0240283 | A1* | 8/2021 | Knoppert | G06F 3/0414 |
| 2021/0373676 | A1* | 12/2021 | Jorasch | G06F 3/038 |
| 2022/0208484 | A1* | 6/2022 | Yang | G06F 3/0202 |

OTHER PUBLICATIONS

Noori, Fariba, et al., "AUBUE: An adaptive user-interface based on users' emotions", Journal of Computing and Security, vol. 3, No. 2, 2016, pp. 127-145.

* cited by examiner

*Primary Examiner* — Daniel W Parcher
(74) *Attorney, Agent, or Firm* — Botos Churchill IP Law LLP

(57) ABSTRACT

The technology provides a system for controlling illumination of a luminous keyboard. A non-transitory storage medium stores a trained machine learning model for identifying a user sentiment. A processor receives at least one keyboard input entered by the user. The processor processes the keyboard input using the trained machine learning model to identify a sentiment or behavior of the user. The processor determines an illumination profile for the keyboard based on the identified user sentiment or behavior. The keyboard illuminates according to the illumination profile.

19 Claims, 8 Drawing Sheets

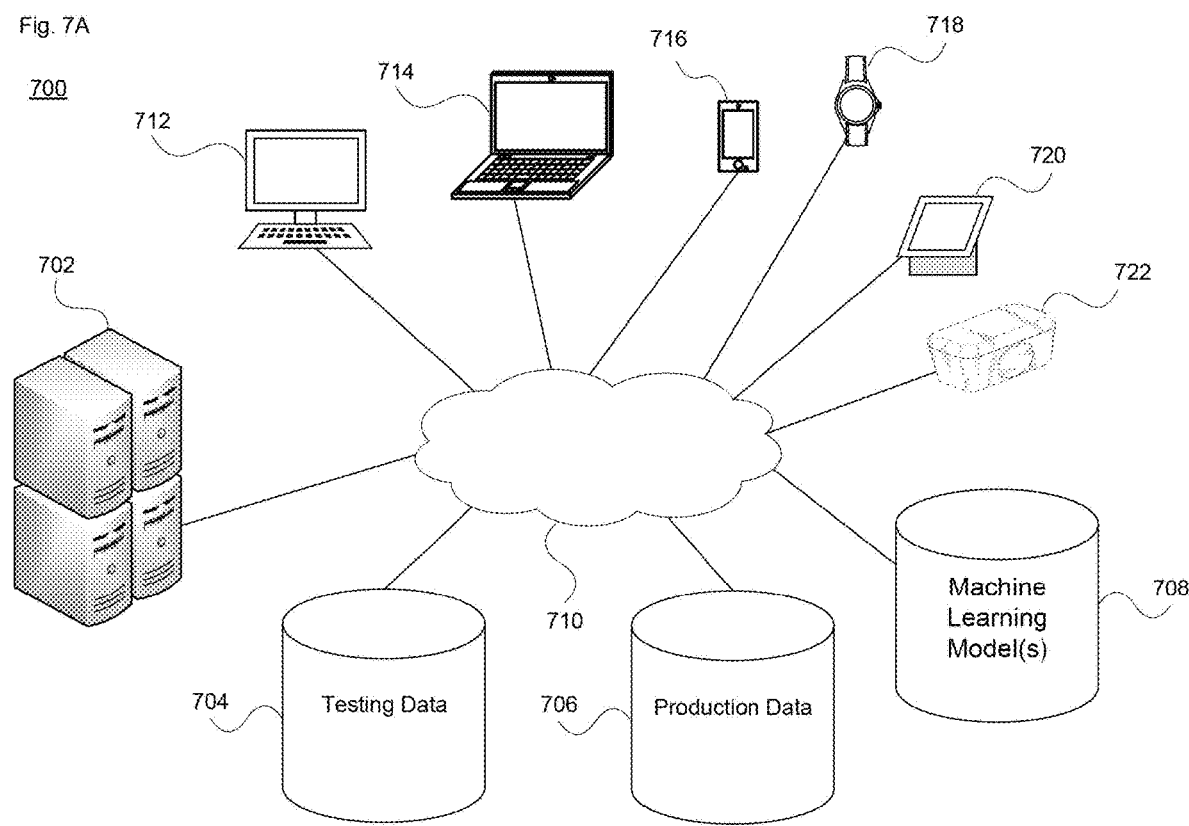

PERSONAL WELLNESS KEYBOARD USING LIGHTING AND MACHINE LEARNING

BACKGROUND

As people spend more and more time on computing devices, there is a trend for increased personal wellness care while people use their devices. Prolonged device usage may affect the person's productivity. In addition, people may display certain behaviors throughout the day that deviate them from reaching a certain goal. For instance, when a person is distracted, or perhaps burned out, he or she may have a hard time performing a certain task. Or when a person is frustrated, they may type an email or other electronic message that has a negative tone, which may be counterproductive to the intent of the communication. These and other types of situations may inhibit personal wellness and are often counterproductive.

BRIEF SUMMARY

Aspects of the technology detect a user's sentiment or behavior that may be remedied via timely attention. This can include sending subtle, timely feedback to the user to help improve the user's sentiment or quell a perceived negative behavior. In one aspect, the technology provides visual feedback through an illuminated keyboard or other device to provide mood lighting to the user. The illuminated device may also serve as a subtle reminder to the user to modify his/her behavior. For instance, illumination emitted from a keyboard or other input device (e.g., a mouse or stylus) may serve as soft, non-intrusive cues to the user without interfering with the user's task at hand.

A consequence of improving a user's sentiment or quelling a perceived negative behavior is that a particular task or process can be completed more effectively. For example, the nature of a user's interaction with a computing device can be improved by encouraging more efficient and effective input to an interface device such as a keyboard. The content which the user inputs to the computing device may improve as a result, when expressed in terms such as accuracy and/or relevance. This can reduce errors, reduce the time taken to complete a particular process or to navigate through a particular workflow, and optimize use of technical resources by the computing device in supporting such processes or workflows. For example, technical resources (such as processing time, communications bandwidth or power) that might otherwise be required to generate and present error messages in response to inappropriate inputs to the computing device, or in generating and presenting graphical user interfaces which are incorrectly requested by a user, are not wasted. The overall time for which such resources are required can be reduced if a process or workflow can be completed more quickly.

In a first aspect, a system for controlling illumination of a user input device is provided. The system comprises: a non-transitory computer-readable storage medium configured to store at least one trained machine learning model, the at least one trained machine learning model configured to identify a sentiment of a user, and at least one processor. The at least one processor is configured to: receive, from the user input device, at least one input entered by the user; process the at least one input using the at least one trained machine learning model to identify a first sentiment of the user, determine an illumination profile for the user input device based on the identified first sentiment; and instruct the user input device to illuminate according to the illumination profile.

In an aspect combinable with the first aspect, the illumination profile may include a value for at least one adjustable parameter associated with light emitted from the user input device.

In an aspect combinable with any one of the previous aspects, the at least one adjustable parameter may include one or more of the following: illumination brightness: illumination intensity; illumination color; illumination color temperature, illumination graphical pattern; illumination time sequence; illumination power on; or illumination power off.

In an aspect combinable with any one of the previous aspects, the at least one processor may be further configured to determine a haptic profile for the user input device based on the identified first sentiment, and instruct the user input device to generate haptic feedback to the user according to the haptic profile.

In an aspect combinable with any one of the previous aspects, the processor may be configured to identify the first sentiment of the user based on one or more of the following derived from the at least one input: a typing speed of the user; a typing intensity of the user; or content typed by the user.

In an aspect combinable with any one of the previous aspects, the illumination profile may be a first illumination profile. The processor may be configured to: receive, from the user input device, a second input entered by the user, wherein the second input occurs after the first input; process the second input using the at least one trained machine learning model to identify a second sentiment of the user; compare the identified second sentiment of the user with the identified first sentiment of the user; select a second illumination profile different from the first illumination profile based on the comparison; and instruct the user input device to illuminate according to the second illumination profile.

In an aspect combinable with any one of the previous aspects, the user input device may be a keyboard.

In an aspect combinable with any one of the previous aspects, the processor may be further configured to process information obtained from one or more sources in combination with the at least one input received from the user input device to identify the first sentiment of the user. The one or more sources may include: an application, a mouse, a trackpad, a wearable sensor, a light sensor, a camera, an accelerometer, a microphone or an external computing device.

In a second aspect, a system for controlling illumination of a user input device is provided. The system comprises: a non-transitory computer-readable storage medium configured to store at least one trained machine learning model to identify a behavior of a user, and a processor. The processor may be configured to: receive, from the user input device, at least one input entered by the user, process the at least one input using the at least one trained machine learning model to identify a first behavior of the user; determine an illumination profile for the user input device based on the identified first behavior of the user; and instruct the user input device to illuminate according to the illumination profile.

In an aspect combinable with the second aspect, the identified first behavior of the user may indicate a workflow condition. The illumination profile may be configured to instruct the user input device to generate a visual signal to the user based on the workflow condition.

In an aspect combinable with the second aspect, the identified first behavior of the user may indicate a concentration condition. The illumination profile may be configured to instruct the user input device to generate a visual signal to the user based on the concentration condition.

In an aspect combinable with any one of the previous aspects, the illumination profile may be a first illumination profile. The processor may be further configured to: receive, from the user input device, a second input entered by the user, wherein the second input occurs after the first input; process the second input using the at least one trained machine learning model to identify a second behavior of the user; compare the identified second behavior of the user with the identified first behavior of the user; select a second illumination profile different from the first illumination profile based on the comparison; and instruct the user input device to illuminate according to the second illumination profile.

In an aspect combinable with any one of the previous aspects, the user input device may be a keyboard.

In an aspect combinable with any one of the previous aspects, the processor may be further configured to process information obtained from one or more sources in combination with the at least one input received from the user input device to identify the first behavior of the user. The one or more sources may include: an application, a mouse, a trackpad, a wearable sensor, a light sensor, a camera, an accelerometer, a microphone or an external computing device.

In a third aspect, a computer-implemented method for controlling illumination of a user input device is provided. The method may comprise: storing, by a non-transitory computer-readable storage medium, at least one trained machine learning model configured to identify a sentiment of a user; receiving, from the user input device, at least one input entered by the user; processing, by at least one processor, the at least one input using the at least one trained machine learning model to identify a first sentiment of the user; determining, by the at least one processor, a first illumination profile for the user input device based on the identified first sentiment; and instructing, by the at least one processor, the user input device to illuminate according to the first illumination profile.

In an aspect combinable with the third aspect, the method may further comprise: receiving, from the user input device, a second input entered by the user, wherein the second input occurs after the first input; processing the second input using the at least one trained machine learning model to identify a second sentiment of the user; comparing the identified second sentiment of the user with the identified first sentiment of the user; selecting a second illumination profile different from the first illumination profile based on the comparison; and instructing the user input device to illuminate according to the second illumination profile.

In a fourth aspect, a computer-implemented method for controlling illumination of a user input device is provided. The method may comprise: storing, by a non-transitory computer-readable storage medium, at least one trained machine learning model configured to identify a behavior of a user; receiving, from the user input device, at least one input entered by the user; processing, by at least one processor, the at least one input using the at least one trained machine learning model to identify a first behavior of the user; determining, by the at least one processor, a first illumination profile for the user input device based on the identified first behavior; and instructing, by the at least one processor, the user input device to illuminate according to the first illumination profile.

In an aspect combinable with the fourth aspect, the method may comprise: receiving, from the user input device, a second input entered by the user, wherein the second input occurs after the first input; processing the second input using the at least one trained machine learning model to identify a second behavior of the user; comparing the identified second behavior of the user with the identified first behavior of the user; selecting a second illumination profile different from the first illumination profile based on the comparison; and instructing the user input device to illuminate according to the second illumination profile.

BRIEF DESCRIPTION OF THE DRAWINGS

FIGS. 7A-B illustrate a system for use with aspects of the technology.

DETAILED DESCRIPTION

1. Overview

The technology involves conducting sentiment and/or behavior analysis of a user via one or more machine learning models. The user's sentiment may reflect their wellbeing, whereas the user's behavior may indicate the user's productivity or engagement level of a certain task. The technology may include training one or more machine learning models to analyze the user's sentiment or behavior based on information collected from one or more sources, including for example keyboard input, along with inputs obtained from other sensors or devices. In response to the analysis, the technology is able to provide a subtle visual stimulus to the user via an illuminated keyboard, which may help influence the user's mood and/or trigger the user to modify his/her behavior.

The technical solutions disclosed herein have many technical advantages. The overall approach provides a technical benefit of detecting certain sentiments or behaviors displayed by the user that may benefit from timely attention, and selects subtle, timely feedback for presentation to the user to help improve the user's sentiment or address a particular behavior. Visual feedback through an illuminated keyboard or other component may not only provide mood lighting to the user, but may also serve as a subtle reminder to the user to modify his/her behavior. Further, illumination emitted from the keyboard may serve as soft, non-intrusive cues to the user without interfering with the user's task at hand.

2. Computing System

Figure 1:
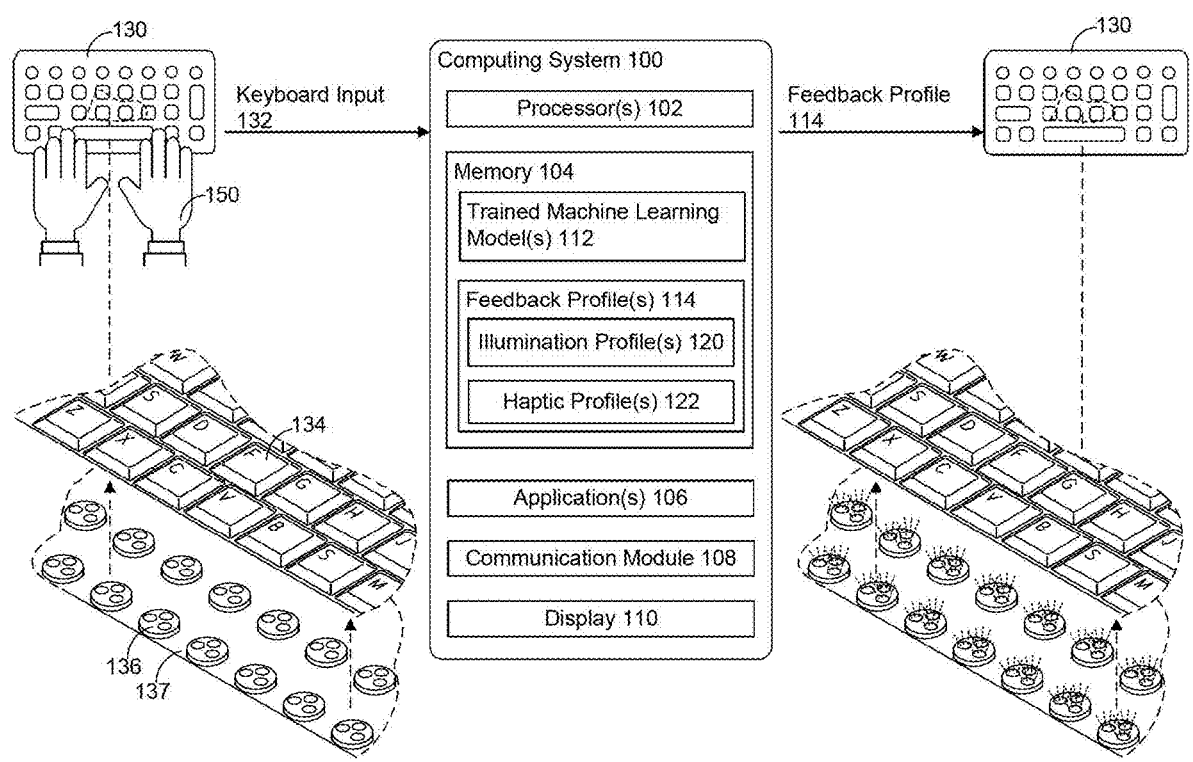
FIG. 1 illustrates an example environment of a luminous keyboard in accordance with aspects of the technology.

FIG. 1 illustrates an example environment in which a computing system 100 may control illumination of a luminous keyboard 130. The computing system 100 may be a laptop computer, tablet PC, netbook, or an in-home device such as a smart display, among other possibilities. The computing system 100 may include one or more processors 102, memory 104, one or more application(s) 106, a communication module 108, and a display 110. The memory 104 may store one or more trained machine learning models 112 configured to analyze the user's sentiment or behavior, and one or more feedback profiles 114 configured to cause improvement to the user's sentiment or trigger the user to modify the user's behavior. The model(s) 112 may process contextual information of the user in order to identify the user's sentiment or behavior.

3. Contextual Information Sources

Figure 2:
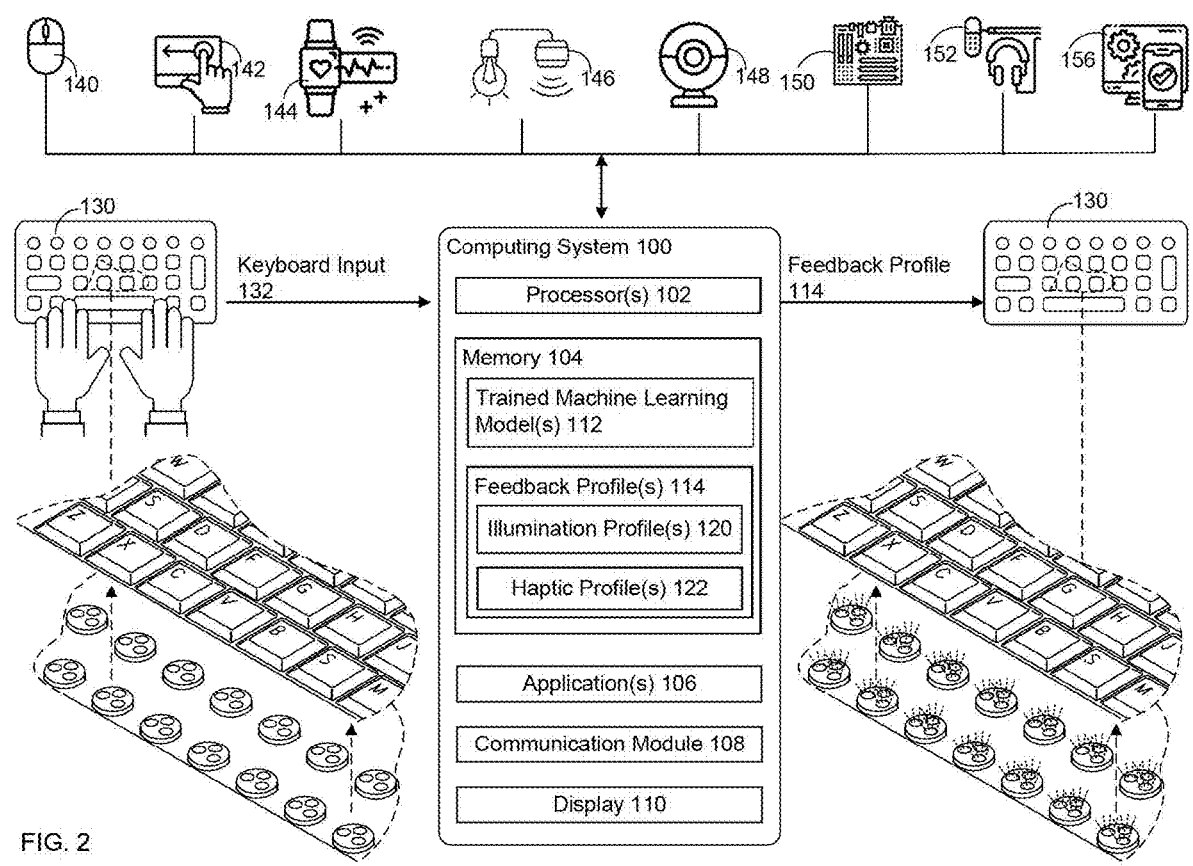
FIG. 2 illustrates another example environment of the luminous keyboard in accordance with aspects of the technology.

The contextual information about the user may be obtained from one or more sources including one or more external devices connected to the computing system 100, and one or more applications running on the computing system 100. With reference to FIG. 2, example external devices may include one or more of a luminous (illuminated) keyboard 130, mouse 140, trackpad 142, wearable sensor 144, light sensor 146, camera 148, accelerometer 150, microphone 152 and an external computing device 156, among other possibilities.

In one embodiment, the model(s) 112 may identify the user's sentiment and/or behavior based on a single source alone, such as the keyboard 130. In another embodiment, information from multiple sources may be used in combination to form a more holistic picture of the user's contextual information. The model(s) 112 may use multifaceted data collected by various sources to provide a robust analysis of the user's sentiment and/or behavior. For instance, the keyboard input 132 may be used in conjunction with contextual analysis of an application 106 running on the computing system 100 to determine the user's sentiment and/or engagement level. Each of the above-mentioned sources is discussed in detail below.

3.1 Keyboard

Figure 3:
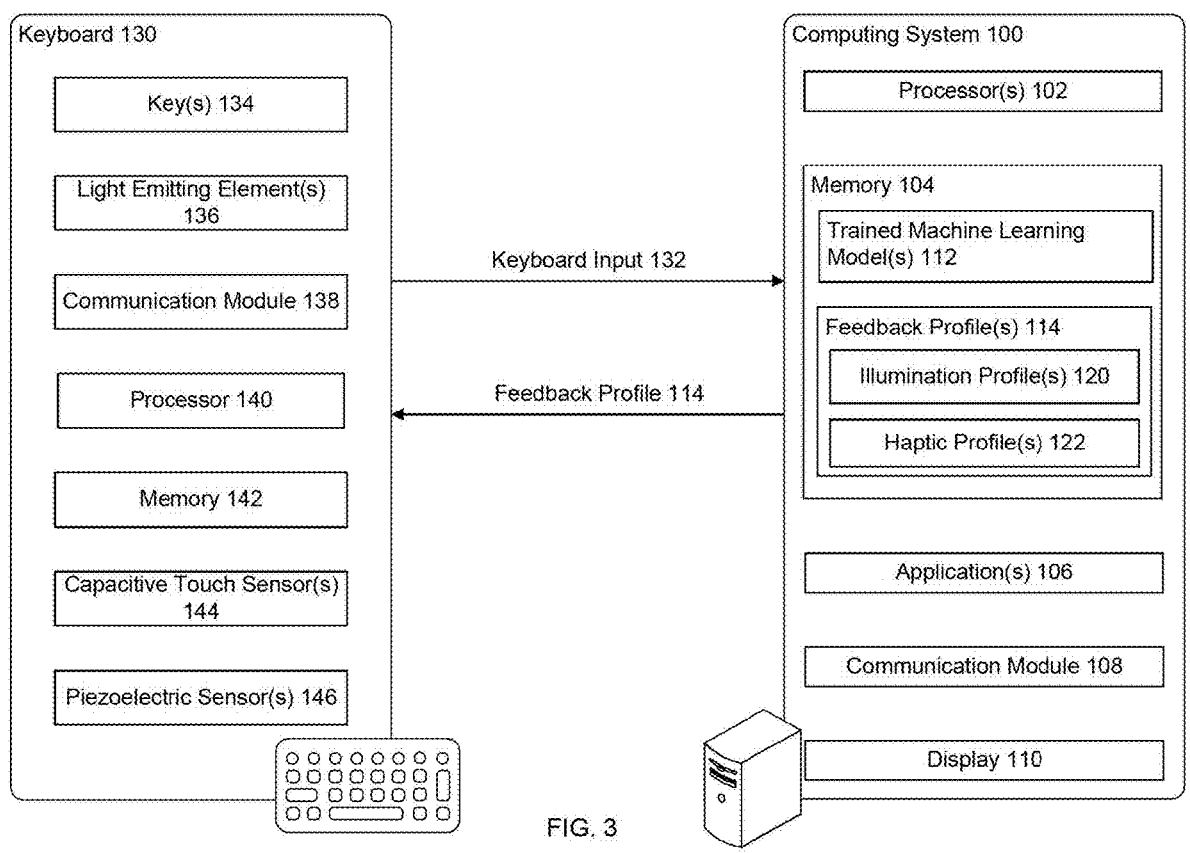
FIG. 3 illustrates a functional diagram showing interactions between the luminous keyboard and a computing system for controlling illumination of the luminous keyboard in accordance with aspects of the disclosure.

According to one configuration, the luminous keyboard 130 may be a red, green and blue (RGB) backlight keyboard. The keyboard 130 may also be referred to as a light-emitting, illuminating, or illuminated keyboard. All the above terms may be used interchangeably in the context of this technology. Referring to FIG. 3, the keyboard 130 may include one or more of the following: one or more keys 134, one or more light emitting elements 136, a communication module 138, a processor 142, memory 142, one or more capacitive touch sensors 144 and one or more piezoelectric sensors 146, among other possibilities.

Each light emitting element 136 may include, by way of example, one or more light emitting diodes (LEDs). The light emitting element(s) 136 may be controlled by one or more adjustable parameters associated with illumination, including: brightness, intensity, color, color temperature, graphical pattern, time sequence, power on, and power off, among other possibilities. As such, each light emitting element 136 may emit a variety of different colors at different intensities, color temperatures, and/or brightness levels, to exhibit different graphical patterns according to different time sequences. The graphical patterns may include, but not limited to, images, signs or messages with and/or without animation effects. Each light emitting element 136 may be turned on or off based on one or more adjustable parameters.

In one embodiment, as shown in FIG. 1, the light emitting element(s) 136 may be positioned on a backboard 137 beneath the keys 134 so as to provide backlight. In the example illustrated in FIG. 1, an array of light emitting elements 136 may be mapped to the keys 134. In another embodiment, the light emitting element(s) 136 may be positioned at one or more edges or bezels of the keyboard 130.

The capacitive touch sensor(s) 144 may detect the user's typing intensity, such as the amount of force that the user exerts on key(s) during typing. The processor 140 of the keyboard 130, such as a microcontroller, may control illumination of the light emitting element(s) 136 based on an illumination profile provided by the computing system 100. The light emitting element(s) 136 may illuminate according to the illumination profile.

In one embodiment, the processor 140 may provide control to one or more piezoelectric sensors 146 to generate haptic feedback to the user based on a haptic profile 122 provided by the computing system 100. Different hepatic feedbacks may be generated in response to different haptic profiles 122.

The keyboard 130 may send keyboard input 132 to the computing system 100 via the communication module 138 for processing by the model(s) 112 to determine the user's sentiment and/or behavior. The keyboard input 132 may include contextual information such as the user's typing speed, typing intensity, and content typed by the user. The model(s) 112 may parse content typed by the user, and extract data including one or more of words, phrases, typing mistakes, deleted words, text that gets modified, and any other clues. Based on the parsed content, the user's typing speed and/or typing intensity, the model(s) 112 may determine the user's sentiment and/or behavior. For example, typing fast or typing certain words may suggest that the user is angry, while typing hard may suggest that the user is agitated. Fast or hard typing may be identified based on signal information from the capacitive touch sensors(s) 144, while the words typed may be identified via an application such as a spellchecker app or a dictionary app.

In one scenario, if the user is in the process of writing a document, the user's typing at the beginning of the document may serve as a baseline speed. As the user continues to type, the model(s) 112 may compare the user's current typing speed with the baseline speed. Depending on the type of the document and/or the development stage of the document, a decrease in the typing speed, or extended pauses, may correlate with decreased user concentration.

After the model(s) 112 identify the user's sentiment and/or behavior, the processor 102 of the computing system 100 may select a suitable illumination profile 120 and/or haptic profile 122, and send the selected illumination profile 120 and/or haptic profile 122 to the keyboard 130. In one embodiment, the illumination profile 120 and/or haptic profile 122 may be sent to the keyboard 130 via an application programming interface (API).

3.2 Trackpad and Mouse

The mouse 140 and/or the trackpad 142 may provide contextual information of the user indicating how fast the user reads or scans a document, or the user's engagement with an app such as a web browser.

3.3 Wearable Sensor

The wearable sensor 144 may be configured to provide one or more of the following types of contextual information of the user including, but not limited to, the user's cardiac activity, Galvanic skin response, sweat or metabolite response, skin conductance, head orientation or body pose, among other possibilities. Further, historical data collected by the wearable sensor 144 may be stored and analyzed by the computing system 100 to obtain additional contextual information of the user including for example, whether the user's heart rate or stress level at any point in time, such as before and/or after engaging with the keyboard or any other device, is higher or lower than normal, and/or whether the user's day is typical or atypical, such as whether the user gets his/her average amount of sleep, among other possibilities. In one example, the wearable sensor 144 may include one or more electrodes mounted on the user to generate an electrocardiogram (ECG) signal. In another example, the wearable sensor 144 may be a smart watch configured to detect the user's heart rate, blood pressure, sweat or metabolite response, hand, wrist or arm position/orientation, etc. In a further example, the wearable sensor 144 may be a head mounted display configured to identify head orientation or gaze direction, etc.

In yet another example, a smartphone in the user's pocket may also be considered to be "worn", where its accelerometer data may infer user stillness or fidgeting. Additionally, a phone or a watch or any other wearable device may also indicate the user's distraction from a certain task, such as a task on the user's computer.

3.4 Light Sensor

The light sensor 146 may be configured to provide the following contextual information of the user such as the type of environment that the user is in, indicating whether the user is in a dark environment (e.g., a room with the shades closed and/or the lights dimmed or turned off) or a bright environment (e.g., a brightly lit room or an outdoor area).

3.5 Camera

One or more cameras 148 may be configured to capture still images and/or record video streams of the user's environment. In one example, the camera(s) 148 may include a webcam used for videoconferences, and/or interactive gaming, among other possibilities. In another example, the camera 148 may be an always-on camera, such as a camera for a human presence sensor (HPS). In yet another example, the camera 148 may be built into a smart home device such as a home display webcam or security camera.

The camera 148 may be configured to provide one or more of the following types of contextual information of the user, including but not limited to, the user's facial expression, the user's posture such as when the user is sitting in a chair or leaning forward, the user's hand gesture, eye tracking information such as the user's eye movement, direction of gaze, eye position, pupil dilation, focus or drooping of eyelids, the number of people in the user's environment, whether the user is engaged in a meeting or other discussion, whether the user is in front of the user's device, whether another person in the user's vicinity is looking at the user's screen, and the user's screentime, among other possibilities. In one embodiment, the model(s) 112 may be configured to continuously process imagery received from the camera(s) 148 to identify one or more of the above contextual information. According to one aspect, if an HPS device is used, the imagery information obtained by the camera may not be stored after processing.

Based on any of the above types of contextual information, the model(s) 112 may determine the user's sentiment and/or behavior. For example, if the user stares out into space for at least a minimum amount of time, or yawns multiple times in a short period of time (e.g., less than 30 seconds, 2 minutes, etc.), or if the user's screentime is short, the model(s) 112 may decide that the user likely lacks concentration on a certain task. If the user rolls eyes, the model(s) 112 may decide that the user is annoyed.

3.6 Accelerometer

The accelerometer 150 may provide one or more of the following types of contextual information of the user, including the user's movement such as whether the user stays still, whether the user is getting up or whether the user is fidgety. In one embodiment, based on such contextual information, the model(s) 112 may determine that the user is distracted. The accelerometer may be part of a phone, watch or any other wearable device.

3.7 Microphone

The microphone 152 may provide one or more types of the following contextual information of the user, including the user's verbal data including for example the user's tone, speech speed, speech content, tremor, cadence, pitch and volume, non-verbal auditory data of the user such as muttering, exclamation, or breathing rate, verbal and non-verbal auditory data of others who are in the user's environment, and number of overlapping voices in the user's environment, among other possibilities. If the user speaks faster and/or louder than other people in the same room, then the model(s) 112 may determine that the user is agitated or excited.

In one example, the microphone 152 may capture noises generated by keyboard typing to detect the user's typing intensity, which provides a more cost-effective alternative to piezo-electric pressure sensing by the keyboard. In one configuration, the microphone 152 may be built into a smart home device such as a home display webcam or security camera.

3.8 Application

One or more applications 106 may run on the computing system 100 or may run on one or more external computing devices 156. The external computing device(s) 156 may include a smart phone, a tablet, a computer, among other possibilities. The application(s) 106 running on the computing system 100 or the external computing device(s) 156 may provide one or more of the following types of contextual information of the user, including but not limited to, the user's journey across different applications or different devices during a time window, the user's activity during a time window when the keyboard is not in use, such as the user's sleep activity recorded by a watch during the user's sleep time, the amount of time that the user spends on an application or a task, how frequently the user interacts with the user's device, how frequently the user switches between different applications or tasks, website(s) visited by the user, digital content consumed or interested by the user, and the user's calendar(s) including information such as the user's day flow, focus time (e.g., time specifically dedicated to focus on a given task), meeting and travel plan, among other possibilities.

If the user is in focus time, then the model(s) 112 may perform sentiment/behavior analysis differently than if the user is in a meeting. For instance, if the user chats with another person during the focus time, the model(s) 112 may determine that the user is distracted. On the other hand, if the same scenario occurs in meeting, the model(s) 112 may determine that the user stays focused.

3.9 Other Sources

The technical solutions are not limited to the above sources of contextual information. Other sources may also be employed to provide contextual information of the user for purposes of analyzing and/or addressing the user's sentiment and/or behavior. Example of others sources may include, but not limited to, stylus, near range radar, mechanical sensors, optical sensors, infrared sensors, magnetic sensors, biometric sensors, a trackball, scroll wheel, switch, touch screen, motion sensor, power button, eject button, fingerprint button, or any other suitable component or device.

The technical solutions are not limited to the model(s) 112 described herein for purposes of analyzing and/or addressing the user's sentiment and/or behavior. The model(s) 112 may be any type capable of performing sentiment and/or behavior analysis.

4. Machine Learning Models

4.1 Baseline Setup

In a baseline setup, the user's typical metrics may be established, including but not limited to, one or more of the user's typical typing speed, typing intensity, trackpad motion speed, mouse scrolling speed, cardiac activity, Galvanic skin response, sweat response, metabolite response, skin conductance, speech tone, speech volume, and speech speed, among others. Each user may have a unique baseline with respect to each of the above metrics. For example, user A may typically type faster with less force than user B, and user A may typically have a faster heart rate than user B.

During operation, to identify the user's sentiment and/or behavior, the model(s) 112 may compare the user's current metric with the baseline metric, derive any delta, and compare the delta to any predetermined threshold. In a first example, if the user's current typing speed exceeds the baseline speed by a first predetermined threshold, then the user may be deemed angry. In a second example, if the user's current typing intensity exceeds the user's baseline intensity by a second predetermined threshold, e.g., the user is typing harder than usual, then the user may be deemed agitated. In a third example, if the user's current heart rate exceeds the user's baseline heart rate by a third predetermined threshold, then the user may also be deemed agitated. In a fourth example, if the user's current skin response differs from the user's baseline skin response by a fourth predetermined threshold, then the user may be deemed excited. In a fifth example, if the user's current ECG signal differs from the user's baseline ECG by a fifth predetermined threshold, then the user may be deemed under stress, and/or experiencing fear, anger or concern.

In one embodiment, the baseline metrics may be set up by using general population metrics, e.g., for all users of a given computing device, or of an app run on many different computing devices. During operation, the model(s) 112 may compare the user's current metric(s) with the general population metric(s) to identify the user's sentiment and/or behavior. If the user speaks louder (or types harder) and faster than the general population baseline, then the model(s) 112 may determine that the user is agitated or excited.

4.2 Sentiment Analysis

The model(s) 112 may include a sentiment classifier. Based on any one or more of the above-mentioned types of contextual information of the user, the sentiment classifier may select one or more of the following sentiments, including but not limited to, annoyed, fearful, angry, hateful, sad, frustrated, concerned, excited, happy, peaceful, surprised, positive, neutral and negative, among other possibilities. In one embodiment, each sentiment may be rated on a numerical scale, such as "high", "medium" or "low" to indicate severity of the sentiment or likelihood of occurrence of the sentiment, among other possibilities.

4.3 Behavior Analysis

The model(s) 112 may include a behavior classifier. Based on any one or more of the above-mentioned contextual information of the user, the behavior classifier may select one or more behaviors: overworked (a workflow condition), a spectrum of behaviors ranging from focused to distracted, and/or another spectrum of behaviors ranging from agitated to calm, among other possibilities. In one embodiment, each behavior may be rated on a numerical scale, such as "high", "medium" or "low" to indicate likelihood of occurrence of the behavior, among other possibilities. The overworked workflow condition may refer to a significant or lasting decline in morale, productivity, or other metric of the user. In one example, overworked with a "high" rate may indicate the user is highly likely overworked. In another example, overworked with a "low" rate may indicate an anticipated overworked situation before it happens. Stimulus, such as visual or haptic stimulus, may be provided to the user, indicating to the user to take a break, so as to prevent the overworked situation. Similarly, in one example, distraction with a "high" rate may indicate that the user is highly likely distracted. In another example, distraction with a "low" rate may indicate that there is a small likelihood that the user is distracted. Focused may portend a low overworked risk.

4.4 Various Model Embodiments

A single model 112 may be employed to identify the user's sentiment or behavior based on contextual information received from one or more sources. Alternatively, multiple models 112 may be employed to perform separate identification. For instance, a first model 112 may be configured to identify the user's sentiment, while a second model 112 may be configured to identify the user's behavior. In another embodiment, an array of models 112 may be employed corresponding to different sources that convey the user's contextual information. For example, in one scenario a first model may be configured to process keyboard input, a second model may be configured to process wearable sensor input, and third model may be configured to process camera input.

Aside from the illustrative embodiments described herein, the model(s) 112 may be any type capable of performing sentiment and/or behavior analysis. Numerous modifications may be made to the illustrative embodiments.

5. Feedback Profile

Based on the identified sentiment and/or behavior, the processor(s) 102 of the computing system 100 may determine if the identified sentiment and/or behavior is a negative sentiment and/or behavior that requires timely attention. For instance, sentiments such as annoyed, fearful, angry, hateful, sad, frustrated or concerned may be considered as negative and require timely attention, whereas sentiments such as excited, happy, peaceful or surprised may be regarded as positive or neutral. Behaviors such as overworked, distracted, or agitated may be regarded as negative, whereas focused and calm may be regarded as positive or neutral.

For any negative sentiment or negative behavior, the processor(s) 102 may provide timely, perceptive feedback to the user so as to influence or cause change to the user's sentiment and/or behavior in a timely fashion. Perceptive feedback may be delivered in the form of illumination feedback in accordance with one or more illumination profiles 120, haptic feedback as defined by one or more haptic profiles 122, and/or graphical feedback on the user's device(s), among other possibilities.

5.1 Illumination Profile for Keyboard

The computing system 100 may store one or more illumination profiles 120 in the memory 104. Each illumination profile 120 may define one or more values for one or more adjustable parameters associated with illumination of the keyboard 130 and/or other components of the system (e.g., mouse, stylus, etc.). Such adjustable parameters may include, but not limited to, illumination brightness, illumination intensity, illumination color, illumination color temperature, illumination graphical pattern, illumination time sequence, illumination power on and illumination power off.

After the keyboard 130 receives the illumination profile, a controller or other processor 140 of the keyboard may instruct the light emitting element(s) 136 to illuminate in a certain fashion, so as to change the user's mood or serve as a subtle visual clue to the user to modify the user's behavior. For example, an increase in illumination brightness or a change of illumination color may serve as gentle feedback to the user, without interfering with the user's task at hand. Such illumination according to the illumination profile may gently bring the user's subconscious mind to whatever change the user needs to make, without the user's direct conscious awareness. In another example, a processor of the computing system 100 may control the illumination of the light emitting element (136) of the keyboard directly.

The illumination profile(s) 120 may be designed to steer the user's sentiment and/or behavior in a pleasing manner. For example, when the user is agitated, the keyboard may illuminate one or more calming patterns as defined by the illumination profile(s) 120. The pattern(s) may repeat in multiple cycles. The memory 104 may store a variety of predefined illumination profiles for different situations. The predefined illumination profiles may be research based, constructed through heuristic studies and/or experimental trials and errors. For instance, research may show that majority users display a positive change, such as feeling more calmed or more focused, in response to one or more predefined illumination profiles.

Example predefined or user-created illumination profiles are provided below. A first illumination profile may define one or more colors to be displayed by one or more light emitting elements 136 of the keyboard 130. A second illumination profile may define a graphical pattern, such as a digital graphical wallpaper or an image, to be displayed by an array of light emitting elements 136, which may be presented across the keyboard (or around the perimeter of a mouse or along a stylus). A third illumination profile may define a time sequence of flashing in one or more colors to be emitted by one or more light emitting elements 136. A fourth illumination profile may instruct the one or more light emitting elements 136 to perform automatic dimming over a time window, such as 2 minutes, during which illumination intensity may gradually decrease. A fifth illumination profile may define a spectrum of shades or colors to be emitted by one or more light emitting elements 136 over a time window, so that the keyboard or other device may slowly shift shade, hue or color during the time window. A sixth illumination profile may define an animated blue crashing wave or other pattern to be illuminated by an array of light emitting elements 136 over a time window. The blue crashing wave (which may be a different color) may be intended to have a soothing effect on the user when the user experiences any of the following identified sentiments and/or behaviors: fearful, angry, hateful, agitated, sad, frustrated and concerned, among other possibilities. A seventh illumination profile may define a rising sun to be illuminated by an array of light emitting elements 136 over a time window. An eighth illumination profile may instruct one or more light emitting elements 136 to start increasing in brightness with slowly increasing color changes. The eighth illumination profile may remind the user to start taking a break, if the model(s) 112 detects that the user is likely overworked. A ninth illumination profile may instruct the light emitting elements 136 to display an animated pattern relating to focus. The ninth illumination profile may remind the user to increase concentration, if the model(s) 112 determines that the user is distracted. In a tenth example, an illumination profile may vary a light intensity according to one or more periodic waveforms. For instance, the tenth illumination profile may have a variable period that matches the user's measured breathing rate. The tenth illumination profile may aim to calm the user by guiding the user to slow down breathing, or breathe deeper. In an eleventh example, an illumination profile may exhibit a linear fade from one color to another. A mid-point where the two colors meet may shift across the keyboard from left-to-right, top-to-bottom, or any other direction, subtly indicating the passage of time or progress toward an endpoint.

In one embodiment, the predefined illumination profiles may serve as default illumination profiles in response to different sentiments and/or behaviors of the user. In another embodiment, during an initial setup process, the user may be presented with a plurality of predefined illumination profiles, and the user may be prompted to select the user's preferred illumination profiles in response to different situations. For example, the user may select a first predefined illumination profile to be implemented when the user is agitated, a second predefined illumination profile to be implemented when the user is overworked, a third predefined illumination profile to be implemented when the user is distracted. The computing system 100 may store the user's preferences, and deploy the user's selected illumination profiles in different situations. For example, the computing system 100 may deploy the first predefined illumination after the machine learning model(s) 112 determines that the user is agitated, and deploy the second predefined illumination profile after the model(s) 112 determines that the user is overworked. Since the user is able to gain familiarity with the selected illumination profiles during the initial setup process, when the user sees that the keyboard illuminates according to any of the selected illumination profiles, the user would know that the keyboard is hinting the user to modify his/her behavior or influence his/her sentiment. For example, when the user sees the blue crashing wave, the user may be reminded to relax and use a softer tone.

In yet another embodiment, during the initial setup process, instead of selecting from the predefined illumination profiles, the user may create one or more personalized illumination profiles or customize one or more predefined illumination profiles for different situations. For example, the user may define illumination color schemes that produce a calming effect on the user, when the user is perceived by the system to be agitated. The computing system 100 may store the user's created illumination profiles, along with the user's preferences, and deploy the user's preferred illumination profiles in different situations.

Aside from the user's sentiment and/or behavior as detected by the model(s) 112, the user's environment as obtained from the user's contextual information may also be taken into consideration when selecting a suitable illumination profile for the user. In one example, when the user is surrounded by other people, the user may desire privacy from prying eyes. The computing system 100 may take the user's privacy into consideration, for instance to avoid selecting certain illumination profiles when others are present (or when other criteria are met), and instead selecting an alternative illumination profile. For instance, the selected illumination profile may have a lower illumination intensity when one or more other people are detected as being nearby. Alternatively, the selected illumination profile may automatically dim or hide certain information that may be associated with the user.

5.2 Illumination Profile Residing on the Keyboard

In one embodiment, the keyboard 130 may be preprogrammed with one or more illumination profiles. After the model(s) 112 determines the user's sentiment and/or behavior, the computing system 100 may send an instruction or a signal to the keyboard 130 indicating a selection of a suitable illumination profile from the preprogrammed illumination profiles, and requesting the keyboard 130 to illuminate according to the selected illumination profile. For example, the keyboard 130 may be preprogrammed with an illumination profile of an animated blue crashing wave, among other illumination profiles. If the model(s) 112 determines that the user is experiencing, e.g., anxiety (or some other sentiment or behavior), the computing system 100 may request the keyboard 130 to display the animated blue crashing wave.

5.3 Illumination Profile for Other Illumination Devices

In one embodiment, the illumination profile(s) 120 may not be limited to keyboard illumination. For example, the illumination profile(s) 120 may extend to any device with at least one light emitting element. Such devices may include, but not limited to, mouse, stylus, smart home lighting device, virtual keyboard or other virtual input device, or any form of an LED device. For example, the mouse may include an edge, bezel or other surface region covered by one or more light emitting elements. The illumination profile(s) 120 may define one or more values for adjustable parameters associated with illumination of such devices, including, but not limited to, illumination brightness, illumination intensity, illumination color, illumination color temperature, illumination graphical pattern, illumination time sequence, illumination power on, and illumination power off.

5.4 Haptic Profile

In addition to or as an alternative to the visual stimulus, the computing system 100 may stimulate the user via haptic feedback. Similar to illumination feedback, haptic feedback may also serve as a subtle, discreet clue to the user to modify his/her behavior or influence his/her sentiment. For example, the keyboard 130 may include one or more piezoelectric sensors 146 configured to provide tactile feedback to the user based on a haptic profile 122 issued by the processor(s) 102 of the computing system 100. The computing system 100 may store one or more predefined haptic profiles 122 in its memory 104. Different haptic profiles 122 may be designated for different types of feedback sensations or effects, including but not limited to, vibrations at different intensities or speeds, or one or more different vibration patterns over a period of time. These feedback sensations or effects may be noticeable to the user, yet without being distracting. In one embodiment, each haptic profile 122 may define a waveform associated with the feedback sensation or effect. Each waveform may have a unique signature, including wave type, amplitude and duration.

After the model(s) 112 identifies the user's sentiment and/or behavior, the processor(s) 102 of the computing system 100 may select a suitable haptic profile 122 based on the user's sentiment and/or behavior. The computing system 100 may then instruct the keyboard 130 to generate haptic feedback to the user according to the selected haptic profile 122. In one embodiment, the model(s) 112 may send an illumination profile 120 and a haptic profile 122 to the keyboard 130. The keyboard 130 may illuminate according to the illumination profile 120, and at the same time generate haptic feedback according to the haptic profile.

In one embodiment, during an initial setup, the user may be presented with a plurality of predefined haptic profiles, and the user may be prompted to select the user's preferred haptic profiles in different situations. In another embodiment, during the initial setup process, instead of selecting from the predefined haptic profiles, the user may create the user's personalized haptic profiles for different situations. Since the user gains familiarity with the selected haptic profiles during the initial setup process, when the user experiences a certain haptic feedback sensation generated by the keyboard according to any of the selected haptic profiles, the user would know that the keyboard is hinting the user to modify his/her sentiment or behavior.

5.5 User Interface Feedback

In addition to or as an alternative to the illumination feedback and/or the haptic feedback, the computing system 100 may provide visual feedback on one or more displays 110. The visual feedback may include, but not limited to, a change of color of a system user interface element such as a launch bar or a browser bar, and a prompt message showing one or more scores reflecting the user's sentiment and/or behavior, among other possibilities. For instance, after the model(s) 112 identifies the user's sentiment and/or behavior, the processor 102 of the computing system 100 may change the color of the launch bar so as to affect the user's mood and/or sentiment, and/or hint to the user to modify his/her behavior. In another embodiment, after the model(s) 112 identify the user's sentiment and/or behavior, the processor 102 may rate the user's sentiment and/or behavior. For example, the processor 102 may determine a mood score reflecting the user's sentiment, and/or a behavior score reflecting the user's behavior. The processor 102 may show the mood score and/or the behavior score on the display 100.

In one example, the model(s) 112 may determine the user's sentiment from the user's instant message conversation or real-time interaction using a different type of app such as a videoconferencing app. The processor 102 may present an indication on the display 110, indicating the user's sentiment. For instance, the processor 102 may change the color of the launch bar, or display a prompt to the user showing the user's mood score.

6. Feedback Adjustment

The computing system 100 may not only detect the user's sentiment or behavior based on any of the above-mentioned contextual information collected at a single point of time, but may also detect a change of sentiment or behavior by analyzing any contextual information over time. For example, the model(s) 112 may detect a change of sentiment by analyzing, one or more of but not limited to, typing speed, typing intensity, typing content, speech volume, and/or speech pitch, over time.

The computing system 100 may track how the user responds to any of the illumination feedback, haptic feedback, and/or user interface feedback, among others. In one example, if the user's sentiment and/or behavior does not change, or if the user's sentiment and/or behavior escalates or otherwise trends in a negative or less desired direction (e.g., gaze direction focused away from a display for more than 2 minutes, or the rate of keyboard input has decreased by 50% over the last 5 minutes), that means the initial feedback is not noticeable or effective to the user. In turn, the processor(s) 102 of the computing system 100 may issue another round of feedback or a combination of different types of feedback with increased noticeability or effectiveness. In another example, if the user's sentiment and/or behavior improves or changes in a positive or desired direction, that means the initial feedback has worked effectively, and may no longer be needed. In turn, the computing system 100 may issue another feedback, such as reduce intensity of the initial illumination profile or haptic profile, or power off illumination or power off haptic feedback.

In one example, the keyboard 130 may initially have no light on. Based on the user's first keyboard input, the model(s) 112 may determine that the user is agitated. As a result, the processor(s) 102 may instruct the keyboard 130 to display a first illumination profile. The first illumination profile may be an animated blue crashing wave with a low illumination intensity level. FIG. 1 illustrates an example transition of the keyboard 130 during this process, where the keyboard initially has no illumination, and then illuminates after receiving the first illumination profile from the computing system 100. In FIG. 1 as well as FIG. 4 to be discussed below, dashed lines on top of each light emitting element 136 represents illumination intensity. The longer the dashed line, the more intense the illumination. If any light emitting element 136 has no dashed lines on top of it, that means no illumination from that element 136.

Figure 4:
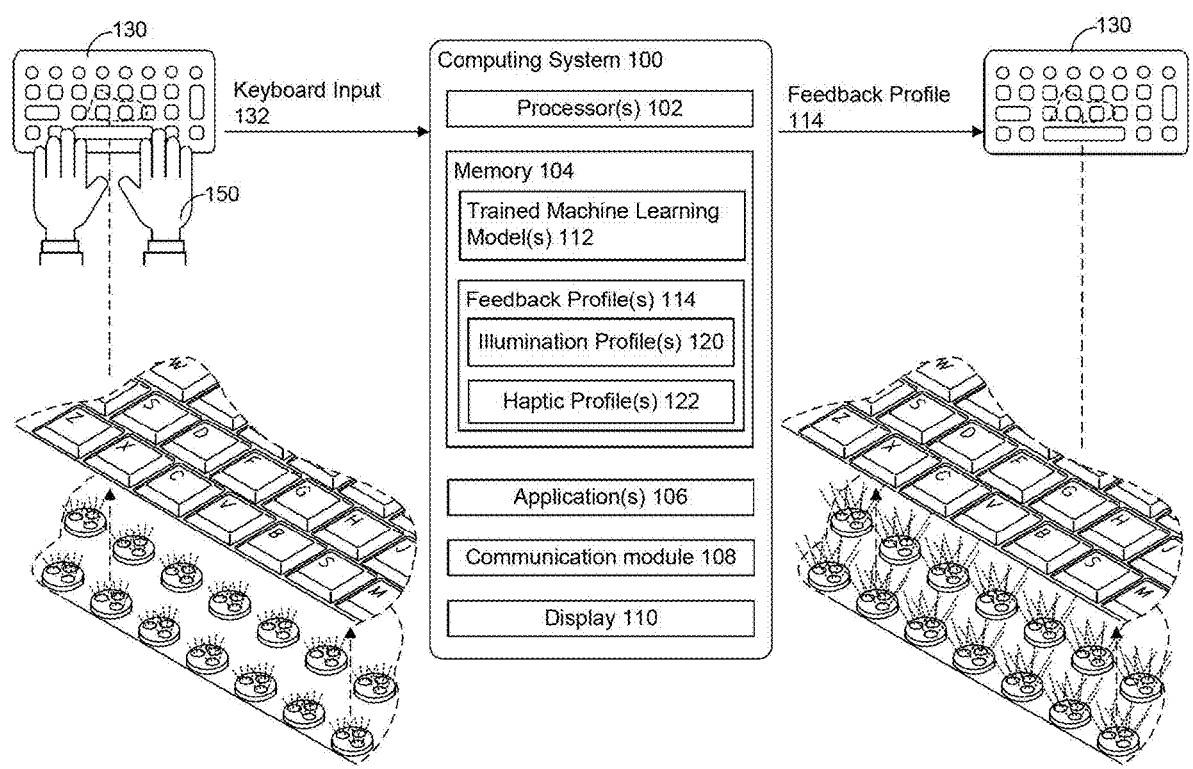
FIG. 4 illustrates yet another example environment of the luminous keyboard in accordance with aspects of the technology.

Subsequently, for example, 10 minutes later, the model(s) 112 may process a second keyboard input from the user, and determine that the user remains agitated or the user's agitation has escalated. As a result, the processor(s) 102 may instruct the keyboard 130 to display a second illumination profile that is more noticeable than the first illumination profile, or has a stronger calming effect than the first illumination profile. The second illumination profile may still be an animated blue crashing wave, but with a higher illumination intensity level. FIG. 4 illustrates an example transition of the keyboard 130, where the keyboard increases illumination intensity during this process. Here, as shown on the bottom left of the figure, the dashed lines from the lighting elements are short, indicating a relatively low illumination intensity. In contrast, as shown on the bottom right of the figure, the dashed lines from the lighting elements are long, indicating a relatively high illumination intensity (by way of example only, from 25%-75% higher intensity than the relatively low intensity).

7. Exemplary Method of Operation

Figure 5:
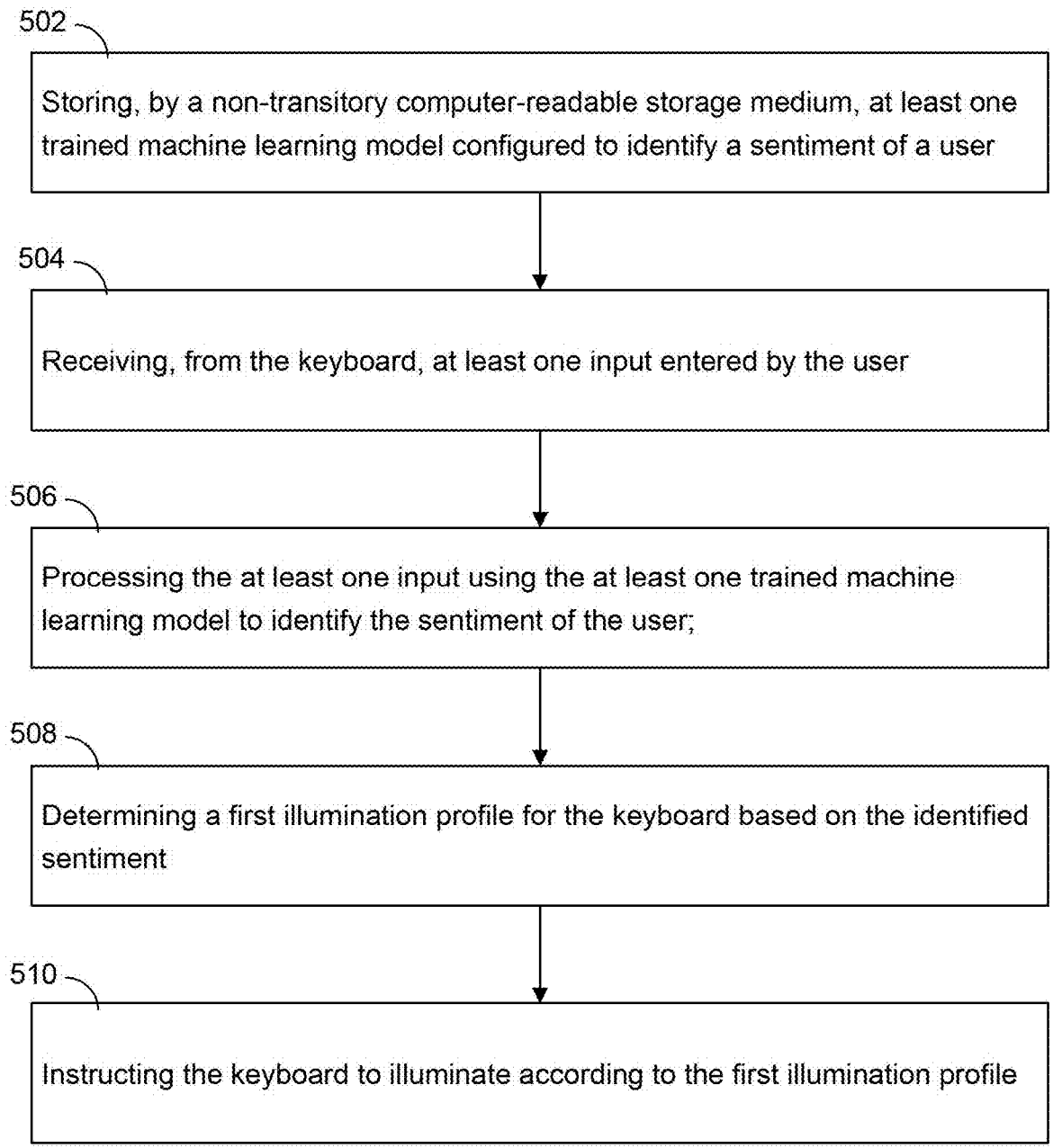
FIG. 5 illustrates a flow diagram showing an exemplary method for controlling illumination of the luminous keyboard in accordance with aspects of the disclosure.

FIG. 5 presents a flow chart illustrating a method for controlling illumination of the keyboard 130. At 502, the memory 104, such as a non-transitory computer-readable storage medium, may store at least one trained machine learning model 112 configured to identify a sentiment of the user. At 504, the processor(s) 102 may receive, from the keyboard 130, at least one input entered by the user. At 506, the processor(s) 102 may process the at least one input using the at least one model 112 to identify a first sentiment of the user. At 508, the processor(s) 102 may determine a first illumination profile for the keyboard 130 based on the identified first sentiment. At 510, the processor(s) 102 may instruct or otherwise cause the keyboard 130 to illuminate according to the first illumination profile.

In one embodiment, the processor(s) 102 may receive, from the keyboard 130, a second input entered by the user. The second input may occur after the first input. The processor(s) 102 may process the second input using the at least one trained machine learning model 112 to identify a second sentiment of the user. The processor(s) 102 may compare the identified second sentiment of the user with the identified first sentiment of the user. The processor(s) 102 may select a second illumination profile different from the first illumination profile based on the comparison. The processor(s) 102 may instruct the keyboard 130 to illuminate according to the second illumination profile.

Figure 6:
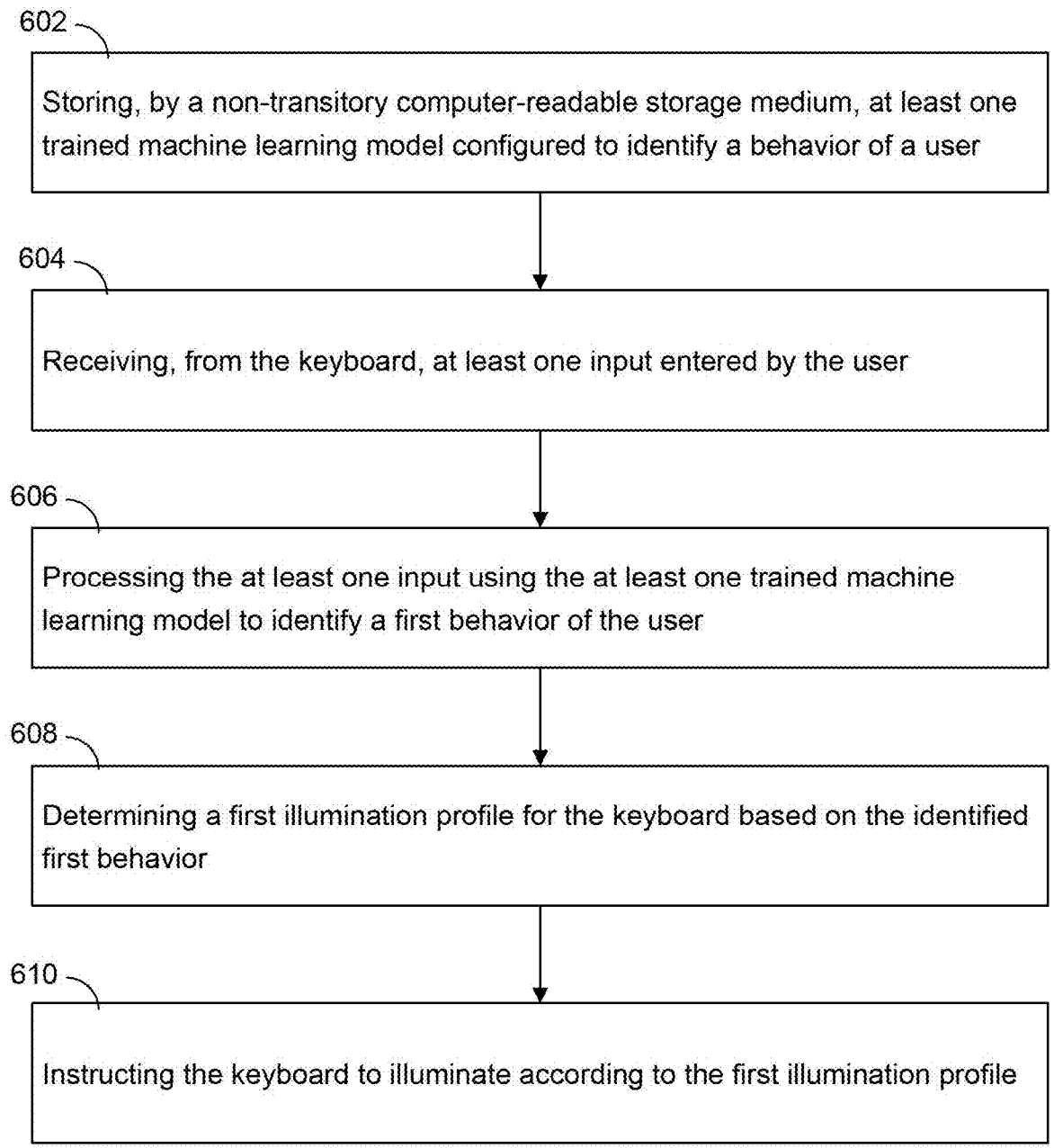
FIG. 6 illustrates a flow diagram showing another exemplary method for controlling illumination of the luminous keyboard in accordance with aspects of the disclosure.

FIG. 6 presents a flow chart illustrating another method for controlling illumination of the keyboard 130. At 602, the memory 104, such as a non-transitory computer-readable storage medium, may store at least one trained machine learning model 112 configured to identify a behavior of the user. At 604, the processor(s) 102 may receive, from the keyboard 130, at least one input entered by the user. At 606, the processor(s) 102 may process the at least one input using the at least one trained machine learning model 112 to identify a first behavior of the user. At 608, the processor(s) 102 may determine a first illumination profile for the keyboard 130 based on the identified first behavior of the user. The processor(s) 102 may instruct the keyboard to illuminate according to the illumination profile.

In one embodiment, the processor(s) 102 may receive, from the keyboard, a second input entered by the user. The second input may occur after the first input. The processor(s) 102 may process the second input using the at least one trained machine learning model 112 to identify a second behavior of the user. The processor(s) 102 may compare the identified second behavior of the user with the identified first behavior of the user. The processor(s) 102 may select a second illumination profile different from the first illumination profile based on the comparison. The processor(s) 102 may instruct the keyboard 130 to illuminate according to the second illumination profile.

8. Example Scenarios and/or Applications

The technology described herein can be used in a wide variety of scenarios and/or applications, as discussed in detail below. In a first example, when the user types in a very animated way (e.g., rapid, light key presses), the model(s) 112 may infer that the user is happy or excited. The model(s) 112 may rely on other contextual information aside from the keyboard input to identify the user's sentiment.

In a second example, the model(s) 112 may detect that the user is typing an angry email (e.g., when the user is typing slowly, with very hard key presses). In response, the processor(s) 102 may instruct the keyboard 130 to generate an animated, soothing blue color so as to remind the user to relax and use a softer tone.

In a third example, the model(s) 112 may detect that the user has spent a long time on a given task and the user's device interaction has begun slowing down. The declining engagement pattern may indicate a workflow condition (e.g., that the user needs a short break). In response, the processor(s) 102 may instruct the keyboard 130 to slowly start increasing illumination brightness, or slowly changing illumination colors so as to remind the user to take a break.

In a fourth example, the model(s) 112 may detect that the user is showing signs of being distracted or sleepy based on one or more sensors, such as an accelerometer or a wearable sensor, even though the user has a "document writing" time slot booked on the calendar. In response, the processor(s) 102 may instruct the keyboard 130 to display an animated focus pattern.

In a fifth example, the model(s) 112 may detect that the user is experiencing increased anxiety, based on the user's increasing heart rate as indicated by a wearable sensor attached to the user, and also based on the user's typing speed as indicated by the keyboard input. The processor(s) may instruct the keyboard 130 to display a blue crashing wave to calm down the user.

In a sixth example, the model(s) 112 may detect the user's engagement level in a conference based on non-verbal auditory data such as the user's tone, cadence and breathing rate. In turn, the processor(s) 102 may instruct the keyboard 130 to dynamically change the illumination color based on different engagement levels.

In a seventh example, the model(s) 112 may detect a loud voice from the user during the user's focus time, and may infer that the user is likely overworked. As a result, the processor(s) 102 may instruct the keyboard 130 to illuminate a soft color, which acts as a reminder to the user to take a break.

In an eighth example, the model(s) 112 may track the user's typing speed over a period of time, and detect a change of tone or voice based on the user's typing speed. In turn, the processor(s) 102 may instruct the keyboard 130 to dynamically change the illumination color based on different tones or voices.

In a ninth example, as the user works on a certain task, such as when writing a document, the model(s) 112 may detect that the user starts to become distracted when one or more of the following occurs: the user's typing speed slows down, a long pause, the user switches applications frequently, the user plays with their phone, or the user stares out of a window as shown in video streams of an always-on camera. In turn, the processor(s) 102 may instruct the keyboard 130 to illuminate a green or other color to help the user focus on the task at hand.

In a tenth example, the model(s) 112 may detect that the user has worked on a certain task, such as when writing a document, for a while, and starts to become less productive. In turn, the processor(s) 102 may instruct the keyboard 130 to flash an orange color which reminds the user to get up and take a walk.

In an eleventh example, the model(s) 112 may detect that the user is getting nervous when delivering a presentation based on the user's increased heart rate as indicated by a wearable sensor. In turn, the processor(s) 102 may instruct the keyboard 130 to display a soothing blue crashing wave.

In a twelfth example, the model(s) 112 may determine that the user is agitated when the user is typing hard on the keyboard with an increased heart rate as indicated by a wearable sensor. In turn, the processor(s) 102 may instruct the keyboard 130 to display a soothing blue crashing wave to calm down the user.

In a thirteenth example, the model(s) 112 may determine that the user is anxious when preparing a document for a meeting. In turn, the processor(s) may instruct the keyboard 130 to display one or more messages or signs to relax the user.

For any of the user's contextual information, user's sentiment, user's behavior, or any other information of the user disclosed herein, the user may have control over what information is sent and/or processed by any of the computing system 100, computing device(s) and/or wireless device(s) and how that information is used. By way of example, the user may be provided with controls allowing the user to make an election as to both if and when systems, programs, or features described herein may enable storage or processing of the user's contextual information, user's sentiment or behavior, or any other information of the user. The user may be provided with controls allowing the user to delete, modify or change permission to share any of the user's contextual information, user's sentiment, user's behavior, or any other information of the user.

9. Example Machine Learning Training Architecture

The model(s) 112 may be trained with contextual information collected from one or more users and collected from one or more sources including, but not limited to, keyboard, application, mouse, trackpad, wearable sensor, light sensor, camera, accelerometer, microphone and any external computing device. For instance, different models 112 may each be trained according to at least one type of contextual information. In one scenario, a hybrid model 112 is trained according to multiple types of contextual information relating to user input (e.g., typing speed, types of words used and/or typing hardness), eye gaze or eye movement (or other eye-related information), and physical information (e.g., head orientation or body pose, or other information from a wearable sensor).

Figure 7B:
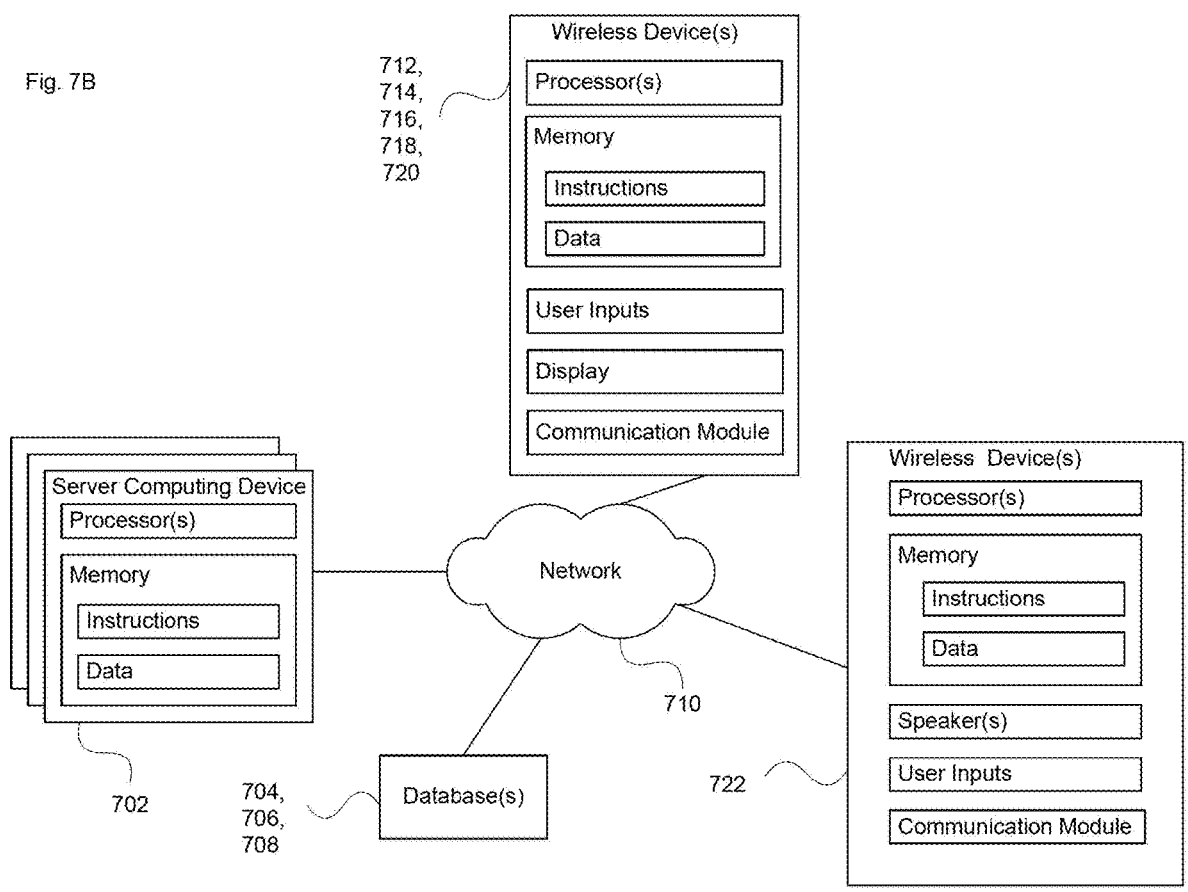

Training may be performed on one or more tensor processing units (TPUs), CPUs or other computing architectures in order to implement the models discussed herein. According to one aspect, the model(s) 112 may be a multivariate non-linear regression model(s). One example computing architecture is shown in FIGS. 7A and 7B. In particular, FIGS. 7A and 7B are pictorial and functional diagrams, respectively, of an example system 700 that includes a plurality of computing devices and databases connected via a network. For instance, computing device(s) 702 may be a cloud-based server system. Databases 704, 706 and 708 may store, e.g., the testing data (such as any of the types of contextual information discussed above), production data and/or trained machine learning models, respectively. The server system may access the databases via network 710. Wireless devices in the field may gather the production data and may receive the trained model(s). Such wireless devices may include one or more of a desktop computer 712, a laptop or tablet PC 714, a mobile phone 716, a smartwatch or other wearable device 718, an in-home assistant device 720 and/or a smart speaker 722. These devices are merely exemplary. Other types of devices, such as a light alarm clock (or sunrise alarm clock), can provide illumination or audible information in accordance with the implementations described herein.

In one example, the computing device 702 may include one or more server computing devices having a plurality of computing devices, e.g., a load balanced server farm or cloud computing system, that exchange information with different nodes of a network for the purpose of receiving, processing and transmitting the data to and from other computing devices. For instance, the computing device 702 may include one or more server computing devices that are capable of communicating with any of the wireless devices 712-722 via the network 710. This may be done as part of hosting one or more collaborative apps (e.g., a videoconferencing program, a chat app, an interactive spreadsheet app or a multiplayer game) or services (e.g., a movie streaming service or interactive game show where viewers can provide comments or other feedback).

10. Example Computing Components

The processors disclosed herein, including the processor(s) 102 of the computing system 100, the processor 140 of the keyboard 130 as well as the processors of the computing device(s) 702 and the wireless devices 712-722, may be any conventional processors, such as commercially available central processing unit CPUs. Alternatively, each processor may be a dedicated device such as an ASIC, graphics processing unit (GPU), tensor processing unit (TPU) or other hardware-based processor. Although FIGS. 1-4 and 7B functionally illustrate the processors, memory, and other elements of a given computing system, computing device or wireless device as being within the same block, such system(s) or device(s) may actually include multiple processors, computing devices, or memories that may or may not be stored within the same physical housing.

Any of the memory disclosed herein, such as the memory 104 of the computing system 100, the memory 142 of the keyboard 130 or the memory of the computing device(s) 702 and the wireless devices 712-722, may store information accessible by the one or more processors, including instructions and data that may be executed or otherwise used by the processor(s). The memory may be of any type capable of storing information accessible by the processor(s), including a computing device-readable medium. The memory may be a non-transitory computer-readable storage medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. Any of the memory disclosed herein may be a hard drive or other storage media located in a housing different from that of the processor(s), for instance in a cloud computing system. Accordingly, references to a processor may be understood to include references to a collection of processors or computing devices or memories that may or may not operate in parallel.

The communication module 108 of the computing system 100, the communication module 138 of the keyboard 130, and/or the communication modules of the computing devices 702 and devices 712-722 may include a wireless transceiver. Alternatively, the communication modules 108, 138 may alternatively or additionally include a wired transceiver. Each communication module may communicate with communication modules of other devices using various configurations and protocols, including short range communication protocols such as near-field communication (NFC), Bluetooth™, Bluetooth™ Low Energy (BLE) or other ad-hoc networks, the Internet, intranets, virtual private networks, wide area networks, local networks, private networks using communication protocols proprietary to one or more companies, Ethernet, WiFi and HTTP, and combinations of the foregoing.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for controlling illumination of a user input device, comprising:
 a non-transitory computer-readable storage medium configured to store at least one trained machine learning model configured to identify a sentiment of a user and one or more predefined illumination profiles configured to affect the sentiment of the user; and
 at least one processor configured to:
  receive, from the user input device, content entered by the user;
  use the at least one trained machine learning model to identify a first sentiment of the user;
  identify a target change in sentiment of the user;
  select a first illumination profile of the one or more predefined illumination profiles for the user input device based on the identified first sentiment and the identified target change in sentiment; and
  instruct the user input device to illuminate according to the first illumination profile;
 wherein the first illumination profile includes a repeated illumination pattern; and
 wherein the at least one processor is further configured to determine a haptic profile for the user input device based on the identified first sentiment, and instruct the user input device to generate haptic feedback to the user according to the haptic profile.

2. The system of claim 1, wherein the first illumination profile includes a value for at least one adjustable parameter associated with light emitted from the user input device.

3. The system of claim 2, wherein the at least one adjustable parameter includes one or more of the following:
 illumination brightness;
 illumination intensity;
 illumination color;
 illumination color temperature;
 illumination graphical pattern;
 illumination time sequence;
 illumination power on; or
 illumination power off.

4. The system of claim 1, wherein the content includes one or more of:
 one or more certain words;
 typing mistakes;
 deleted words; or
 modified text.

5. The system of claim 1, wherein the at least one processor is configured to:
 receive, from the user input device, additional content entered by the user;
 process the additional content using the at least one trained machine learning model to identify a second sentiment of the user;
 compare the identified second sentiment of the user with the identified first sentiment of the user;
 select a second illumination profile different from the first illumination profile based on the comparison; and instruct the user input device to illuminate according to the second illumination profile.

6. The system of claim 1, wherein the at least one trained machine learning model identifies the sentiment of the user based on at least one of a typing speed or typing intensity of the user.

7. The system of claim 1, wherein the at least one trained machine learning model is configured to process imagery received from a camera to identify one or more types of contextual information of the user.

8. The system of claim 1, wherein a plurality of models are used in combination to collect data from multiple sources to analyze the first sentiment.

9. The system of claim 1, wherein a plurality of models are employed to identify the first sentiment, each model of the plurality of models corresponding to a different source of contextual information.

10. A system for controlling illumination of a user input device, comprising:
   a non-transitory computer-readable storage medium configured to store at least one trained machine learning model to identify a behavior of a user and one or more predefined illumination profiles configured to affect the behavior of the user; and
   a processor configured to:
     receive, from the user input device, content entered by the user;
     use the at least one trained machine learning model to identify a first behavior of the user;
     identify a target change in behavior of the user;
     select a first illumination profile of the one or more predefined illumination profiles for the user input device based on the identified first behavior of the user and the identified target change in behavior; and
     instruct the user input device to illuminate according to the first illumination profile;
   wherein the first illumination profile includes a repeated illumination pattern; and
   wherein the at least one processor is further configured to determine a haptic profile for the user input device based on the identified first behavior, and instruct the user input device to generate haptic feedback to the user according to the haptic profile.

11. The system of claim 10, wherein the identified first behavior of the user indicates a workflow condition.

12. The system of claim 11, wherein the first illumination profile is configured to instruct the user input device to generate a visual signal to the user based on the workflow condition.

13. The system of claim 10, wherein the identified first behavior of the user indicates a concentration condition.

14. The system of claim 13, wherein the first illumination profile is configured to instruct the user input device to generate a visual signal to the user based on the concentration condition.

15. The system of claim 10, wherein the processor is further configured to:
   receive, from the user input device, additional content entered by the user;
   process the additional content using the at least one trained machine learning model to identify a second behavior of the user;
   compare the identified second behavior of the user with the identified first behavior of the user;
   select a second illumination profile different from the first illumination profile based on the comparison; and
   instruct the user input device to illuminate according to the second illumination profile.

16. A computer-implemented method for controlling illumination of a user input device, comprising:
   storing, by a non-transitory computer-readable storage medium, at least one trained machine learning model configured to identify a sentiment of a user and one or more predefined illumination profiles configured to affect the sentiment of the user;
   receiving, from the user input device, content entered by the user;
   using the at least one trained machine learning model to identify a first sentiment of the user;
   identifying a target change in sentiment of the user;
   selecting, by at least one processor, a first illumination profile of the one or more predefined illumination profiles for the user input device based on the identified first sentiment and the identified target change in sentiment; and
   instructing, by the at least one processor, the user input device to illuminate according to the first illumination profile;
   wherein the first illumination profile includes a repeated illumination pattern; and
   wherein the at least one processor is further configured to determine a haptic profile for the user input device based on the identified first sentiment, and instruct the user input device to generate haptic feedback to the user according to the haptic profile.

17. The method of claim 16, further comprising:
   receiving, from the user input device, additional content entered by the user;
   processing the additional content using the at least one trained machine learning model to identify a second sentiment of the user;
   comparing the identified second sentiment of the user with the identified first sentiment of the user;
   selecting a second illumination profile different from the first illumination profile based on the comparison; and
   instructing the user input device to illuminate according to the second illumination profile.

18. A computer-implemented method for controlling illumination of a user input device, comprising:
   storing, by a non-transitory computer-readable storage medium, at least one trained machine learning model configured to identify a behavior of a user and one or more predefined illumination profiles configured to affect the behavior of the user;
   receiving, from the user input device, content entered by the user;
   using the at least one trained machine learning model to identify a first behavior of the user;
   identifying a target change in behavior of the user;
   selecting, by at least one processor, a first illumination profile of the one or more predefined illumination profiles for the user input device based on the identified first behavior and the identified target change in behavior; and
   instructing, by the at least one processor, the user input device to illuminate according tothe first illumination profile;
   wherein the first illumination profile includes a repeated illumination pattern; and
   wherein the at least one processor is further configured to determine a haptic profile for the user input device based on the identified first behavior, and instruct the user input device to generate haptic feedback to the user according to the haptic profile.

19. The method of claim 18, further comprising:

receiving, from the user input device, additional content entered by the user;

processing the additional content using the at least one trained machine learning model to identify a second behavior of the user;

comparing the identified second behavior of the user with the identified first behavior of the user;

selecting a second illumination profile different from the first illumination profile based on the comparison; and instructing the user input device to illuminate according to the second illumination profile.

* * * * *